United States Patent
Shchori et al.

(10) Patent No.: US 7,022,431 B2
(45) Date of Patent: Apr. 4, 2006

(54) THIN LAYER ELECTROCHEMICAL CELL WITH SELF-FORMED SEPARATOR

(75) Inventors: Ehud Shchori, Rehovot (IL); Shalom Luski, Rehovot (IL)

(73) Assignee: Power Paper Ltd., Petah Tikva (IL)

( * ) Notice: Subject to any disclaimer, the term of this patent is extended or adjusted under 35 U.S.C. 154(b) by 556 days.

(21) Appl. No.: 09/931,943

(22) Filed: Aug. 20, 2001

(65) Prior Publication Data
US 2003/0036003 A1  Feb. 20, 2003

(51) Int. Cl.
*H01M 2/14* (2006.01)
*H01M 2/16* (2006.01)

(52) U.S. Cl. ............... 429/129; 429/144; 429/249; 429/253; 429/254; 429/255; 29/623.1

(58) Field of Classification Search ............... 429/129, 429/144, 247, 249, 253, 254, 255, 178, 303, 429/306, 309, 317; 29/623.1
See application file for complete search history.

(56) References Cited

U.S. PATENT DOCUMENTS

| | | | |
|---|---|---|---|
| 3,660,163 A | 5/1972 | Moser | |
| 3,901,732 A | 8/1975 | Kalnoki Kis et al. | |
| 4,623,598 A | 11/1986 | Waki et al. | |
| 4,834,772 A | 5/1989 | Dixon et al. | |
| 5,155,144 A | 10/1992 | Manganaro et al. | |
| 5,468,570 A | 11/1995 | Ferrando | |
| 5,652,043 A | 7/1997 | Nitzan | |
| 5,658,684 A * | 8/1997 | Lake ...................... | 429/178 X |
| 5,897,522 A | 4/1999 | Nitzan | |
| 5,962,168 A | 10/1999 | Denton, III | |
| 6,045,942 A | 4/2000 | Miekka et al. | |
| 6,080,282 A | 6/2000 | Kolb et al. | |
| 6,194,098 B1 | 2/2001 | Ying et al. | |
| 2003/0059673 A1 | 3/2003 | Langan et al. | |
| 2003/0070283 A1 | 4/2003 | Webber | |

FOREIGN PATENT DOCUMENTS

| | | |
|---|---|---|
| JP | 6155866 | 6/1994 |
| WO | WO 98/56458 A | 12/1998 |
| WO | WO 00/62362 A | 10/2000 |
| WO | WO 03/017392 A | 2/2003 |

* cited by examiner

Primary Examiner—Stephen J. Kalafut
(74) Attorney, Agent, or Firm—Kenyon & Kenyon

(57) ABSTRACT

A method of forming an electrochemical cell is disclosed. The method comprises contacting a negative pole layer and a positive pole layer one with the other or with an optional layer interposed therebetween. The pole layers and the optional layer therebetween are selected so as to self-form an interfacial separator layer between the pole layers upon such contacting.

91 Claims, 2 Drawing Sheets

THIN LAYER ELECTROCHEMICAL CELL WITH SELF-FORMED SEPARATOR

FIELD OF THE INVENTION

The present invention relates to thin layer, liquid state electrochemical cells with, preferably, an open configuration, that are used as battery power sources by converting chemical energy to electrical energy, and particularly to such a cell with a liquid electrolyte and self-formed porous separator layer between negative and positive pole layers.

BACKGROUND OF THE INVENTION

There are two broad classes of batteries: liquid state batteries, i.e., those with a liquid or wet electrolyte, and solid state batteries, i.e., those with an electrolyte in a solid state. Solid state batteries have advantages over liquid state batteries in that they inherently do not dry out and do not leak. However, they suffer major disadvantages when compared with liquid state batteries since, due to limited diffusion rates of charges through a solid, their operation is temperature dependent to a much larger extent, and many operate well only under elevated temperatures. Due to the limited diffusion rates, solid state batteries have a low ratio of electrical energy generated versus their potential chemical energy.

Liquid state, thin layer batteries typically include a positive and a negative active insoluble material layers put together with a porous separator layer interposed therebetween, which separator layer is soaked with a liquid electrolyte solution. Such batteries, examples of which are described in U.S. Pat. No. 4,623,598 to Waki et al., and in Japanese Patent Document JP 61-55866 to Fuminobu et al., have to be sealed within a sheathing film to prevent liquid evaporation, and are therefore closed electrochemical cells. Being closed cells, these batteries tend to swell upon storage due to evolution of gases. This is a fatal problem in thin layer batteries having no mechanical support, because the pressure imposed by the accumulated gases leads to separation of the layers, making the battery inoperative. Means to overcome this problem include: (i) the use of a polymer increased-viscosity agent, such as hydroxyethylcellulose, which bonds the battery layers together and serves as a mechanical support; and (ii) the addition of mercury to prevent the formation of gases, especially hydrogen. However, the polymer is limited in its effectiveness and the mercury is environmental hazardous.

Another solution to the problem of the evolution of gases in liquid state batteries is proposed in U.S. Pat. No. 3,901,732 to Kis et al., in which a gas-permeable, liquid-impermeable polymeric material is used as a sheathing film to enclose the battery cell. The polymeric material allows venting of undesirable gases formed within the battery while preventing any liquid loss from the battery.

A more direct and efficient approach to avoid undesired gas accumulation in liquid state thin layer batteries is disclosed in U.S. Pat. Nos. 5,652,043 and 5,897,522 to Nitzan, the disclosures of which are incorporated herein by reference. U.S. Pat. Nos. 5,652,043 and 5,897,522 disclose liquid state batteries constructed as open cells for facilitated release of gases, while at the same time are constructed to avoid liquid evaporation and drying out of the batteries. Such a construction enables production of thin layer batteries devoid of casings, which batteries are simpler, thinner, more flexible and cheaper for mass production.

Reference is now made to FIG. 1, which illustrates a basic configuration of the flexible, thin layer, open electrochemical cell of U.S. Pat. Nos. 5,652,043 and 5,897,522, referred to hereinbelow as cell 10.

Cell 10 includes a layer of an insoluble negative pole 14, a layer of an insoluble positive pole 16 and a layer of a porous separator 12 interposed therebetween. The layer of the separator allows ionic transfer of electrolyte between the pole layers. It is noted that throughout the specification herein, the negative pole is where oxidation occurs, whereas the positive pole is where reduction occurs.

Separator 12 typically includes a porous insoluble substance, such as, but not limited to, filter paper, plastic membrane, cellulose membrane, cloth, non-woven material (e.g., cotton fibers) and the like, and is soaked with the aqueous electrolyte solution. The electrolyte solution typically includes a deliquescent (and hygroscopic) material for keeping open cell 10 wet at all times, an electroactive soluble material for obtaining the required ionic conductivity and a water-soluble polymer for obtaining the required viscosity for adhering pole layers 14 and 16 to separator 12.

By being hygroscopic, the deliquescent material maintains open cell 10 moisturized at all times. The level of moisture within the cell may vary depending on the deliquescent material selection, its concentration and ambient humidity and temperature. Suitable deliquescent materials include, but are not limited to, calcium chloride, calcium bromide, lithium chloride, zinc chloride, potassium biphosphate, potassium acetate and combinations thereof.

The electroactive soluble material is selected in accordance with the materials of which the negative and positive pole layers are made. Examples of suitable electroactive soluble materials include zinc chloride and zinc bromide for various primary cells, and potassium hydroxide and sulfuric acid for rechargeable cells.

The water-soluble polymer is employed as an adhesive agent to bond pole layers 14 and 16 to separator 12. Many types of polymers are suitable for this purpose, such as, for example, polyvinyl alcohol (PVA), poly(acryl amide), poly (acrylic acid), poly(vinyl pyrrolidone) (PVP), polyethylene oxide, agar, starch, hydroxyethylcellulose and combinations and copolymers thereof.

In all of the embodiments of U.S. Pat. Nos. 5,652,043 and 5,897,522, the porous separator layer is formed or manufactured as a separate layer from the negative and positive pole layers. This, in turn, is limiting in the sense that (i) it calls for at least three manufacturing steps; and (ii) the contact between the layers is typically less than optimal.

SUMMARY OF THE INVENTION

In one aspect, the present invention seeks to provide improvements to the flexible, thin layer, open liquid state electrochemical cells disclosed in U.S. Pat. Nos. 5,652,043 and 5,897,522. In the present invention, and in contrast with the prior art, the step of manufacturing a separator layer to be interposed between the pole layers is devoid. Rather, ingredient solutions, which include electroactive soluble materials and, optionally and preferably, a deliquescent material and a water-soluble polymer, are selected so that an interfacial layer of a porous separator is self-formed between the pole layers upon an interaction between selected ingredients in the negative and positive pole layers or, optionally, upon an interaction of both pole layers with an optional intermediate layer. The cell thus formed is preferably sufficiently deliquescent for keeping the pole layers substantially wet at all times, and sufficiently electroactive for obtaining ionic conductivity between the pole layers.

The interaction that forms the interfacial separator layer may be of several alternative types. Thus, there may be a physical interaction or chemical reaction between the pole layers or the pole layers and the optional layer disposed therebetween, which results in the formation of a gel or a precipitate between the pole layers, which gel or precipitate serves as a porous separator soaked with a liquid electrolyte.

According to one aspect of the present invention there is provided a method of forming an electrochemical cell, the method comprising contacting a negative pole layer and a positive pole layer one with the other or with an optional layer interposed therebetween, the pole layers and the optional layer being selected so as to self-form an interfacial separator layer between the pole layers upon the contacting.

According to another aspect of the present invention there is provided an electrochemical cell comprising a negative pole layer, a positive pole layer and an interfacial separator layer interposed therebetween, the negative pole layer and the positive pole layer are selected so as to self-form the interfacial separator layer upon contacting one with the other or with an optional layer interposed therebetween.

According to further features in preferred embodiments of the invention described below, the pole layers and the optional layer are selected such that the electrochemical cell is sufficiently deliquescent for keeping the pole layers generally wet and sufficiently electroactive for obtaining ionic conductivity between the pole layers.

According to still further features in the described preferred embodiments the interfacial separator layer comprises a polymer precipitate or a gel.

According to still further features in the described preferred embodiments the interfacial separator layer self-forms via a physical interaction.

According to still further features in the described preferred embodiments the physical interaction results in a formation of a polymer precipitate or a gel between the pole layers.

According to still further features in the described preferred embodiments the interfacial separator layer self-forms via a chemical reaction.

According to still further features in the described preferred embodiments the chemical reaction results in a formation of a polymer precipitate or a gel between the pole layers.

According to still further features in the described preferred embodiments the interfacial separator layer self-forms via a physical interaction between at least one polymer and at least one polymer precipitating agent.

According to still further features in the described preferred embodiments the interfacial separator layer self-forms via a physical interaction between at least one polymer and at least one electrostatic cross-linking agent.

According to still further features in the described preferred embodiments the interfacial separator layer self-forms via a physical interaction between at least two polymers.

According to still further features in the described preferred embodiments the physical interaction between the at least two polymers is selected from the group consisting of an electrostatic interaction and a non-electrostatic interaction.

According to still farther features in the described preferred embodiments the non-electrostatic interaction is selected from the group consisting of hydrogen bonding interaction and van-der-Waals interaction.

According to still further features in the described preferred embodiments the interfacial separator layer self-forms via a physical interaction between at least two polymers and at least one activator.

According to still further features in the described preferred embodiments the at least one activator is selected from the group consisting of zinc chloride and $H_3O^+$ ions.

According to still further features in the described preferred embodiments the interfacial separator layer self-forms via a chemical reaction between at least one polymerizable unit and at least one polymerization activator.

According to still further features in the described preferred embodiments at least one of the pole layers and the optional layer includes a material that is both deliquescent and electroactive, e.g., zinc chloride.

According to still further features in the described preferred embodiments the positive pole layer includes manganese dioxide powder and the negative pole layer includes zinc powder.

According to still further features in the described preferred embodiments the negative pole layer further includes carbon powder.

According to still further features in the described preferred embodiments the positive pole layer further includes carbon powder.

According to still further features in the described preferred embodiments the at least one polymer includes poly (vinyl pyrrolidone) (PVP).

According to still further features in the described preferred embodiments the at least one polymer precipitating agent includes zinc chloride.

According to still further features in the described preferred embodiments the at least one polymer includes at least one polysaccharide.

According to still further features in the described preferred embodiments the at least one polysaccharide includes chitosan.

According to still further features in the described preferred embodiments the at least one polysaccharide includes at least one carboxylated polysaccharide.

According to still further features in the described preferred embodiments the at least one polysaccharide includes sodium alginate.

According to still further features in the described preferred embodiments the at least one polysaccharide includes pectin.

According to still further features in the described preferred embodiments the at least one electrostatic cross-linking agent includes zinc chloride.

According to still further features in the described preferred embodiments at least one of the at least two polymers is poly(acrylic acid).

According to still further features in the described preferred embodiments at least one of the least two polymers is a polymer selected from the group consisting of PVP, poly(vinyl alcohol), poly(ethylene oxide) and poly(ethyl oxazoline) (PEOx).

According to still further features in the described preferred embodiments at least one terminal is provided in electrical contact with at least one of the pole layers, applied via a printing technology and made of a metal such as, but not limited to, iron, nickel, titanium, copper, stainless steel and mixtures thereof.

In accordance with a preferred embodiment of the present invention the cell further includes at least one externally located adhesive backing.

In accordance with another preferred embodiment of the present invention the cell further includes at least one externally located protective layer.

The present invention successfully addresses the shortcomings of the presently known configurations by providing a cell in which a separator layer self-forms, thereby reducing the number of manufacturing steps and ensuring optimal contact between the separator layer and the pole layers.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
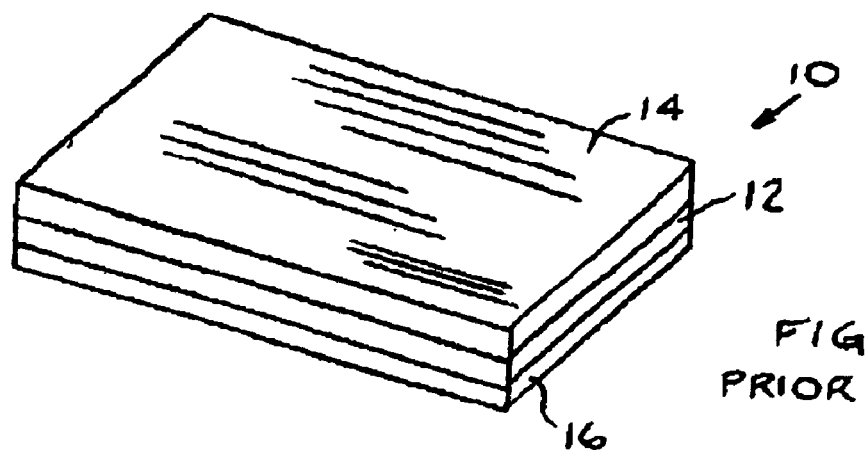
FIG. 1 is a simplified pictorial illustration of a basic configuration of a prior art, thin layer open electrochemical cell.

The present invention is of thin layer, liquid state electrochemical cells that include self-formed separators and methods for their production.

The principles and operation of the electrochemical cell and the method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
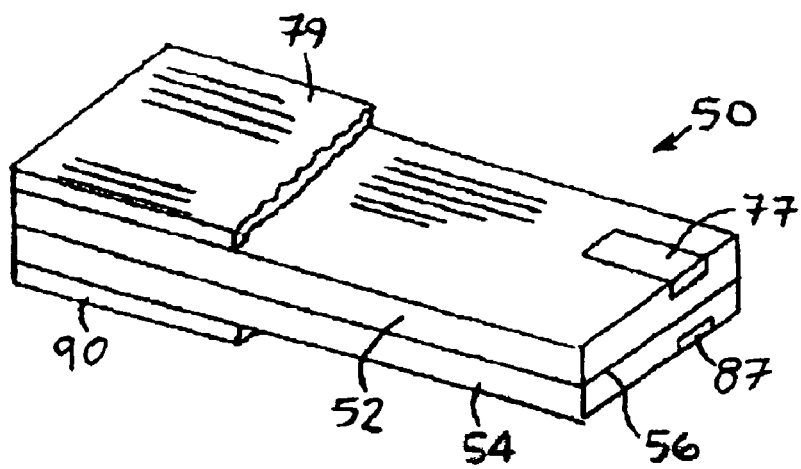
FIG. 2 is a simplified pictorial illustration of a thin layer open electrochemical cell, constructed and operative in accordance with a preferred embodiment of the present invention.

Reference is now made to FIG. 2, which illustrates a flexible, thin layer, open electrochemical cell 50, constructed and operative in accordance with a preferred embodiment of the present invention.

Cell 50 includes a negative pole layer 52 and a positive pole layer 54. Each of negative and positive pole layers 52 and 54 includes a mix of a suitable (negative or positive, respectively) active insoluble material with an aqueous electrolyte solution including an electroactive soluble material, and preferably also a deliquescent material and an adhesive polymer.

Suitable pairs of active powder materials to be used in the negative and positive pole layers, respectively, include, but are not limited to, manganese dioxide/zinc, silver oxide/zinc, cadmium/nickel oxide and iron/nickel oxide. The $MnO_2$ and AgO may be optionally mixed with a conductive carbon powder, as is known in the art.

A single material may function as both a deliquescent material and as the electroactive soluble material. Such a material should have suitable electroactive and hygroscopic characteristics. Suitable materials of this type include, but are not limited to, zinc chloride and zinc bromide. Preferably, the aqueous electrolyte solution includes $ZnCl_2$, which is highly hygroscopic and can therefore serve as a highly efficient deliquescent material, as well as the electroactive soluble material in cell 50.

A single material may function as a deliquescent material and as an adhesive polymer. Such a material should have suitable hygroscopic and adhesive characteristics. Suitable materials of this type include, but are not limited to, dextrane, dextrane sulfate, cellulose ethers such as methyl cellulose and hydroxyethylcellulose, polyvinylalcohol, poly (ethyl oxazoline) and combinations or copolymers thereof. However, since $ZnCl_2$ is highly hygroscopic, the use of thereof as the deliquescent material in the electrolyte solution is highly preferable over the described polymers, and therefore the polymer(s) are mainly aimed at providing adhesion of the pole layers to the self-formed separator.

The aqueous electrolyte solution in pole layers 52 and 54 further includes one or more water-soluble polymer(s) and, optionally, one or more polymerizing agent(s), which are selected such that an interfacial porous separator layer 56 self-forms as a result of an interaction therebetween upon contacting. Self-formed interfacial porous separator layer 56 is electrolyte-permeable and therefore allows ions transfer between pole layers 52 and 54.

Thus, according to the present invention, and in contrast with the prior art, separator 56 is not an independent layer interposed in a manufacturing process of cell 50 between pole layers 52 and 54, rather, it self-forms between pole layers 52 and 54, thus avoiding the need for introducing a separate separator between the pole layers in the cell and improving the contact between pole layers 52 and 54 and self-formed porous separator layer 56.

In an alternative, electrochemical cell 50 is formed using three layers, such that positive pole layer 54 and negative pole layer 52 are contacted with a thin layer interposed therebetween. The ingredients contained in the pole layers and the thin layer are selected such that interfacial separators self-form at both sides of the thin layer, and, as the reaction proceeds, integrate into a single, self-formed, interfacial separator layer 56 disposed between the pole layers 52 and 54. This approach has an advantage as it better allows to control the thickness of self-formed interfacial separator layer 56.

In both alternatives, however, the interfacial porous separator according to the present invention self-forms at an optimal place between the pole layers, has an optimal thickness and optimal intimate contact with the pole layers. As seen in FIG. 2, interfacial separator 56 is preferably formed only at the interface of pole layers 52 and 54, whereas the rest of pole layers 52 and 54 are substantially free of any interaction therebetween.

As will be described in length below, there are several approaches as to the method by which interfacial separator 56 self-forms. In preferred embodiments of the invention, however, deliquescent and/or adhesive polymers are used to self-form separator 56. Such deliquescent and/or adhesive polymers are deliquescently and/or adhesively most active when in solution. However, the adhesion and/or deliquescent properties of an electrolyte solution containing such polymers which also take part in the self-formation of separator layer 56 are not adversely affected as sufficient polymer molecules remain dissolved in the electrolyte solution, so as not to compromise the adhesion and/or deliquescent properties of the cell.

According to the present invention, the negative and positive pole layers may be formed by coating a pair of thin inert sheets or films, such as MYLAR® film, other PET (polyethylene terephthalate) film or polyester film, with the selected poles materials and electrolyte solutions. The two films are brought into contact with each other and an interfacial porous separator self-forms at the interface between the two pole layers.

Optionally, an additional thin aqueous layer, which includes one or more ingredients selected to interact with both positive and negative pole layers to self-form an interfacial separator, is interposed between the negative and positive pole layers. The three layers are brought into contact, so as to self-form interfacial separators at both sides of the thin layer, which integrates to a single interfacial separator layer self-formed between the pole layers at the end of the process, so as to provide a separator of thicker dimensions.

The cell formed by the method of the present invention is preferably sufficiently deliquescent for keeping the pole layers substantially wet at all times, and sufficiently electroactive for obtaining ionic conductivity between the pole layers. These deliquescent and electroactivity properties of the cell may be obtained by using an aqueous electrolyte solution that includes $ZnCl_2$, as described hereinabove.

Figure 3:
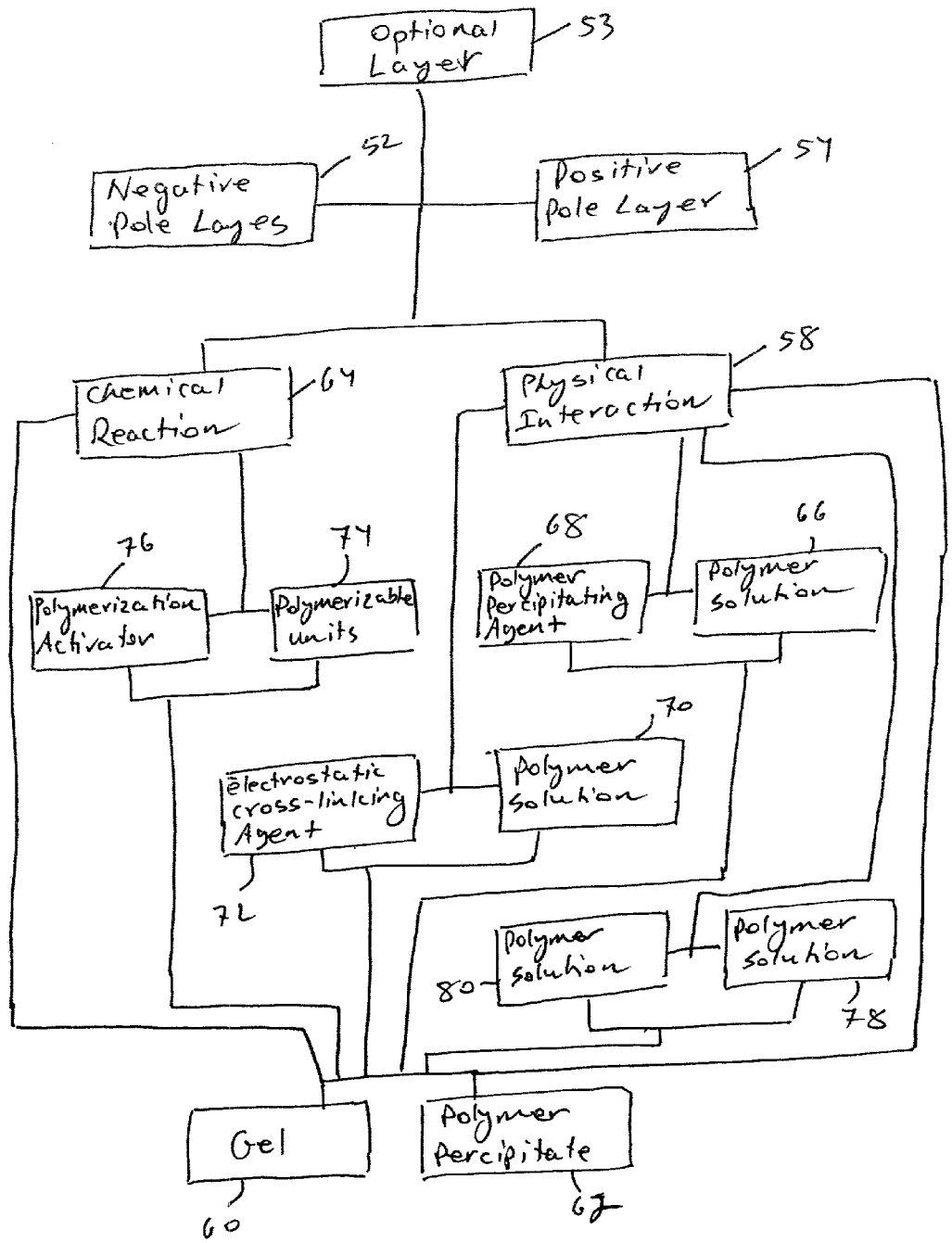
FIG. 3 is a simplified block diagram of methods for forming an electrochemical cell, in accordance with preferred embodiments of the present invention.

As is shown in FIG. 3, the solid interfacial separator layer self-forms either as a gel 60 or as a polymer precipitate 62. The term "gel" as used herein describes a more homogenous and typically somewhat transparent matrix. The phrase "polymer precipitate" as used herein describes a less-transparent matrix, which can be, for example, cloudy or opaque as it is less homogenous and ordered at the microscopic level.

As is further shown in FIG. 3, the present invention employs several alternative types of interactions that are used to self-form the gel or polymer precipitate as the interfacial porous separator, and which are described in greater detail hereinbelow. These interactions involve, for example, precipitation of one or more polymers, co-precipitation of two or more polymers or polymerization of polymerizable units.

Thus, gel 60 or polymer precipitate 62 may be a coacervation formed by an interaction between the positive and negative pole layers with one another or with an additional thin layer. "Coacervation" is a term used herein to describe the phase separation of a polymer-rich phase from a macromolecular solution that occurs when the solubility is reduced by some chemical or physical means. Coacervation is often used in polymer science to describe the precipitation of polymers as a result of some specific interactions, normally interactions at interfaces.

The interaction between the layers, by which the interfacial separator layer is formed, can be categorized as either physical or chemical reaction.

Thus, as is further shown in FIG. 3, gel 60 or precipitate 62 self-forms between the negative and positive pole layers of the electrochemical cell as a result of a physical interaction 58 therebetween. Physical interaction 58, according to the present invention, involves a formation of gel 60 or polymer precipitate 62 as a result of non-covalent interactions between components present in the pole layers and, optionally, in the additional thin layer 53 such as, but not limited to, electrostatic interactions, hydrogen bonds interactions, van-der-Waals interactions or a combination thereof.

The formation of the interfacial separator as gel 60 or polymer precipitate 62 by physical interaction 58 can include, for example, precipitation of a polymer 66 by a polymer precipitating agent 68, an electrostatic cross-linking of a polymer 70 effected by a cross-linking agent 72 or a cross-linking of two or more polymers 78 and 80, which results in co-precipitation thereof.

According to a preferred embodiment of the present invention, the interfacial separator self-forms as a gel or a polymer precipitate as a result of a physical interaction between one or more layer(s) that include an aqueous solution of a polymer such as, but not limited to, PVP or chitosan, and one or more layers that include a polymer precipitating agent such as, but not limited to, a concentrated solution (e.g., 55%) of $ZnCl_2$.

According to another preferred embodiment, the interfacial separator self-forms as a gel or a polymer precipitate as a result of an electrostatic physical interaction between one or more layers that include an ionic polymer solution (e.g., a polysaccharide anionic solution such as sodium alginate) and one or more layers that include an electrostatic cross-linking agent 72 (e.g., $ZnCl_2$).

According to another preferred embodiment, the interfacial separator self-forms as a gel or a polymer precipitate as a result of an electrostatic physical interaction between one or more layers that include an ionic polymer in solution having a positive charge (e.g., cationic solution of a polymer) and one or more layers that include a polymer in solution having a negative charge (e.g., anionic solution of a polymer), in which case the interfacial separator self-forms as a co-precipitate of both polymers.

According to another preferred embodiment of the present invention, the interfacial separator self-forms as a gel or a polymer precipitate as a result of a cross-linking that involves hydrogen bonding between one or more layers that include a hydrogen-acceptor polymer in solution (e.g., a solution of PVP) and one or more layers that include a hydrogen-donor polymer in solution (e.g., a solution of poly(acrylic acid)), in which case the interfacial separator self-forms as a co-precipitate of both polymers.

As is further shown in FIG. 3, in the alternative, gel 60 or precipitate 62 self-forms between the negative and positive pole layers of the electrochemical cell as a result of a chemical reaction 64. Chemical reaction 64, according to the present invention, involves a formation of gel 60 or polymer precipitate 62 as a result of covalent interactions, which include the formation of new covalent bonds. Chemical reaction 64 can include, for example, polymerization of one or more polymerizable unit(s) 74, by a polymerization activator 76.

As used herein, the phrase "polymerizable units" includes chemical moieties capable of forming multiple unit macromolecules. The phrase "polymerizable units" reads on basic polymerizable units as well as polymerizable polymers capable of polymerizing into still larger polymers. The phrase "polymerization activator" reads on any chemical which induces polymerization of polymerizable units, either as a catalyst, a copolymerizing agent or a chemical cross-linker by catalysis or by virtue.

In one embodiment, the interfacial separator self-forms as a gel or a polymer precipitate as a result of a chemical reaction between one or more layers (52, 54 and optionally also 53, FIG. 3) that include one or more polymerizable units and one or more layers that include a polymerization activator which induces polymerization of the polymerizable units to a higher polymerization degree.

In another embodiment, one or more layers include a polymer solution of one or more polymerizable units (e.g., polyisocyanate) and one or more layers include another polymer solution of one or more polymerizable units (e.g., polyamine such as chitosan and polyethyleneimine or polyglycol such as poly(ethylene glycol) and polysaccharide), and the two soluble polymers chemically interact therebetween so as to produce a non-soluble co-polymer which forms the interfacial separator. Optionally, one of more layers may further include one or more polymerization activator(s) which induce the formation of the non-soluble co-polymer.

In another embodiment, one of more layers include an aqueous solution of one or more polymerizable units and one of more layers include a chemical activator that serves as a cross-linking agent (by induction or by virtue) and, optionally, another aqueous solution of one or more polymerizable units, in which case the interfacial separator self-forms as a result of a chemical cross-linking interaction.

Thus, the interfacial separator self-forms between the positive and negative pole layers by either physical interaction 58 or chemical reaction 64 as described hereinabove and is further detailed hereinbelow.

An example of a physical interaction in which a gel or a polymer precipitate is formed, is a precipitation interaction between zinc chloride, which acts as a deliquescent material, as an electroactive soluble material and as a precipitating agent, and an aqueous solution of PVP.

In preliminary experiments it was observed that PVP films do not dissolve in 55% zinc chloride and do not appreciably swell. It was therefore predicted that interacting a PVP solution with a concentrated solution of zinc chloride would result in the precipitation of PVP.

This prediction was reduced to practice by contacting a pair of inert films, as described hereinabove, coated with an electrolyte solution of zinc chloride (55%) and PVA (8%–12%) with an aqueous solution of 10% PVP K-90 (containing 2% saturated solution of methylene blue in ethanol as an indicator) that was placed therebetween. It was found that zinc chloride progressively diffused into the polymer solution of PVP, and a gel or a polymer precipitate formed rapidly at the interface of the layers as a very thin blue colored film. The gel or polymer precipitate formed in these experiments had a thickness in the range of 12–17 μm, but it is to be understood that these are only exemplary values, and the invention is by no means limited to these values. The gel or polymer precipitate was formed as a relatively hard solid matrix that could be integrally separated from the layered structure.

In other experiments that were conducted to demonstrate a formation of an interfacial solid layer by a precipitation interaction, a different technique was used. This technique involved a pair of inert films, such as MYLAR®, that was coated with a solution of 55% zinc chloride and 8–12% PVA, which were further coated with a thin layer of a PVP solution. The two films were contacted and the gel or polymer precipitate immediately formed therebetween.

In other experiments that involved precipitation interaction, an interfacial solution containing a mixture of PVP and PVA (poly(vinyl alcohol)) was employed and the two techniques descried hereinabove were performed. The obtained results showed that increasing the PVA concentration in the interfacial solution resulted in the formation of a gel or polymer precipitate that is much porous than that obtained using PVP alone and is therefore softer and includes larger amount of the electroactive zinc chloride solution therein.

These comparative experiments show that the mechanical properties and ionic conductivity of the obtained gel or polymer precipitate can be controlled by the ratio of polymers in the interfacial solution.

Another example of a physical precipitation interaction is an interaction between zinc chloride and chitosan. Chitosan is an amino functional polysaccharide, which can be found, for example, in the shell of insects and Crustacean such as crabs. Chemically, it is a polyglucose similar to cellulose except for the substitution of one hydroxyl group on each saccharide unit by an amino group. Chitosan is soluble in dilute acids such as 1% acetic acid.

A viscous solution (about 100 centipoise) of 1% chitosan (FLUKA, low molecular weight grade) in 1% acetic acid was prepared. A substrate such as of polyethylene terephthalate (PET) was coated with a solution of 8–12% PVA (poly(vinyl alcohol)) in 55% zinc chloride and the chitosan solution was applied thereon. The chitosan solution reacted with the zinc chloride solution so as to form a thin layer of a soft gel which has a dry touch.

A physical interaction that includes an electrostatic interaction between anionically charged polymers and zinc ions that forms ionically cross-linked polymers (gels) was also explored. Anionically charged polymers that may be suitable for such interaction are polymers bearing free carboxylic groups. An example of such a carboxylated polymer is sodium alginate, which is a naturally occurring polysaccharide found and extracted from algae and is commonly used in the food industry and dental laboratories. Sodium alginate is known as a water-soluble polymer that forms strong gels upon contact with multi-valent cations of elements such as calcium or zinc. Experiments showed that dropping a drop of 1–2% sodium alginate solution into dilute zinc chloride solution resulted in a spontaneous coacervation and a formation of a solid gel glob.

The unique feature of the alginate gel is the formation of a firm gel with a solid content of only 1–2%, which enables the formation a separator that acts as a good mechanical barrier with a minimum sacrifice of conductivity.

Thus, it is shown herein that there may be a difference between the gel or polymer precipitate formed by an electrostatic cross-linking interaction as opposed to that formed by a precipitation interaction. The electrostatic cross-linking interaction can occur at low zinc ions concentrations and therefore the ionically cross-linked gel or polymer precipitate forms immediately upon contacting the zinc chloride solution even when relatively thick layers are used. Thus, the gel or polymer precipitate formation in this case occurs at early stages of the diffusion process, i.e., before the accumulation of high level of zinc ions at the interfacial layer. Contrary, the rate of formation of the gel or precipitate formed in the precipitation interaction, as in the example with PVP, was found to be time-dependent on the diffusion of zinc chloride into the PVP solution, as this interaction requires a built-up of high zinc chloride concentrations at the interfacial layer (e.g., higher than 17% for the precipitation interaction of PVP). Thus, the precipitation interaction is highly dependent upon the thickness of the layers.

Yet another example of a suitable polysaccharide for forming ionically cross-linked gel or polymer precipitate as the interfacial separator is pectin. Pectin is a polysaccharide of a complex nature. Pectin is known to exist as a variety of structures with a common feature of the presence of carboxylic groups, while some are in an ester form. The ratio between ester to free carboxylic acid is one of the differences between the varying structures of pectin. The gel or polymer precipitate formed with a 4% pectin solution, using the technique described hereinabove for alginate, was found to be softer and weaker as compared with the alginate gel or polymer precipitate.

The co-precipitation of two or more different polymers by a cross-linking interaction so as to form a gel or polymer precipitate as the interfacial separator was also explored. There are many examples of water-soluble polymers that form a gel upon mixing, as a result of an electrostatic cross-linking or non-electrostatic cross-linking. For example, poly(acrylic acid) (PAA), which is a hydrogen-donor polymer can interact, via hydrogen bonding, with a hydrogen-acceptor polymer such as, but not limited to, PVP, PVA, poly(ethylene oxide) and poly(ethyl oxazoline) (PEOx) in solution, so as to form a co-precipitation product.

Thus, in one example, a gel or polymer precipitate was formed by co-precipitation of a poly(vinyl pyrrolidone/acrylic acid) copolymer, also referred to herein as poly(VP/AA). This co-precipitation was achieved by preparing a solution of 0.71 grams of poly (VP/AA) where the ratio of PVP/PAA was 3/1, 6.0 grams of water and 0.60 grams (to achieve 25% acid neutralization) of KOH. The formed solution is hazy and contains about 10% polymer. The solution was spread over a substrate coated with an electrolyte solution of 55% zinc chloride and 8–12% PVA and a soft translucent wet gel was initially formed and became sticky as the interaction proceeded. A ratio of 3/1 PVP/PAA was needed in this case since at lower PVP concentrations (e.g., 1/1 PVP/PAA) the polymer was found soluble in 55% zinc chloride. The addition of KOH to the solution, which is aimed to partially neutralize the PAA, is recommended since it provides the formation of a thin film. By partially neutralizing the PAA, the hydrogen-bonding interaction between the two polymers in the polymer solution is avoided, and the polymers mixture is therefore soluble. Upon contacting the acidic electrolyte layer, the PAA regains its hydrogen-donor free carboxylic groups, and thereby interacts, via hydrogen bonds, with the PVP, so as to form a polymer coacervate. Thus, by physically interacting a PVP solution with a PAA solution that is partially neutralized, a cross-linking interaction that involves hydrogen bonds formation therebetween results in a co-precipitated product that can serve as an interfacial separator.

In another example, PAA was interacted via hydrogen bonding with poly(ethyl oxazoline) (PEOx). PEOx is a polymer that is very close to PVP. Both are tertiary amides that are structurally related to the polar aprotic solvents DMAC (N,N-dimethylacetamide) and NMP (N-methyl-2-pyrrolidone). PEOx, like PVP, forms a complex (as a polymer precipitate or gel) with PAA. As in the example described hereinabove, the PAA solution was partially neutralized in order to maintain the PAA soluble. Thus, a PAA solution was prepared by mixing 7.13 grams of 25% poly (acrylic acid) (MW 240,000) with 2.00 grams 25% sodium hydroxide to affect 50% acid neutralization. 2.57 grams of this solution were then mixed with 4.26 grams of 10% poly(ethyl oxazoline) (MW 500,000) solution, and the final solution was applied on a substrate coated with an electrolyte solution containing PVA and zinc chloride as described hereinabove. By contacting this acidic electrolyte solution, the partially neutralized PAA regained its hydrogen-donor free carboxylic groups, and thereby interacted, via hydrogen bonds, with the PEOx solution, so as to form the gel or polymer precipitate. The gel or polymer precipitate was formed at the interface as a thin, dry and rather rigid film. This film may be plasticized by the addition of PVA to the polymer mixture or by increasing the level of the PEOx in the polymer mixture, in order to form a softer, and thus more conductive interfacial separator.

The co-precipitation interaction of PAA and PEOx described hereinabove further demonstrates a co-precipitation physical interaction between polymeric solutions, which can include a physical interaction that results upon contacting other components in the electrolyte solution, such as zinc chloride or $H_3O^+$ ions that affect the pH of the solution. In this case, the gel or polymer precipitate is formed as a result of an interaction between a polymeric solution of mixed polymers and another layer that contains a co-precipitation activator as described.

In this respect, it was found that interacting a solution of PAA alone (instead of a mixture of PAA with either PVP or PEOx) with an electrolyte solution of 8–12% PVA/55% zinc chloride resulted in the precipitation of small solid PAA fragments rather than a formation of a continues film. This phenomenon can be attributed to the heat that develops upon mixing the two solutions, which affects the solubility of PAA in the formed interfacial solution. Since PAA was found soluble in 55% $ZnCl_2$ only at a temperature higher than 40° C., it is assumed that contacting the two solutions results first in an exothermic interaction, which is followed by the precipitation of PAA and prevents a spontaneous precipitation of a continuous film. As an example of a cross-linking chemical reaction which can be used to self-form an interfacial porous separator layer between positive and negative pole layers, one can consider the chemical cross-linking polymerization of acrylamide by bis(acrylamide) in the presence of TEMED (tetramethylethylenediamine) and with ammonium persulfate used as an activator for the cross-linking reaction. The overall concentration of the formed poly(acrylamide) and the relative concentration of acrylamide versus bis(acrylamide) can be used to dictate the overall porosity of the formed gel or polymer precipitate.

Thus, using the interactions described hereinabove, an interfacial porous separator layer can be self-formed by interacting one pole layer with another pole layer, where the layers include the solutions described and exemplified hereinabove so as to form the gel or polymer precipitate at the interface thereof. Optionally, the pole layers can interact at both sides of another layer interposed therebetween where each of the layers include solutions that interact as described and exemplified hereinabove so as to form two gels or polymer precipitates which integrate with time to form a single self-formed interfacial porous separator layer.

As seen in FIG. 2, electrochemical cell 50 may also include negative 77 and positive 87 terminals, which are in electrical contact with the corresponding pole layers 52 and 54, respectively. Terminals 77 and 87 are made of any suitable materials such as, but not limited to, graphite or metals such as iron, nickel, titanium, copper, stainless steel and mixtures thereof, and are preferably applied to cell 50 by a suitable printing or lithography technology.

These terminals are used to electrically connect the electrochemical cell to a load such as an electrical device. The terminals may be located in any desired location of the cell, and may have any suitable shape and size. Depending upon the specific application, the terminals may protrude from the surface and dimensions of the cell.

As is further shown in FIG. 2, cell 50 may further include at least one externally located adhesive backing 79, which enables attaching the cell to various surfaces. Cell 50 may also include at least one externally located protective layer 90 to physically protect all other layers.

The self-formed interfacial separator layer of the present invention offers two major advantages as is compared to the prior art. First, in preferred embodiments, the assembling of only two layers is required, whereas the third layer (the separator) spontaneously self-forms therebetween. Second, as the separator self-forms it results in optimal and intimate interaction with the pole layers at the microscopic level, which assures even and efficient ionic conductivity throughout the cell geometry. An inherent advantage of the self-formed separator of the invention is that by selecting the ingredients used for its formation one can control its thickness, porosity, adhesiveness, etc., so as to control the structural and electrical properties of the cell thus formed.

It is appreciated that certain features of the invention, which are, for clarity, described in the context of separate embodiments, may also be provided in combination in a single embodiment. Conversely, various features of the invention, which are, for brevity, describing the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of forming an electrochemical cell, the method comprising contacting a negative pole layer and a positive pole layer one with the other, wherein contacting causes components in electrolyte solution in negative pole layer and components in electrolyte solution in positive pole layer to interact and/or react with each other and self-form an interfacial separator layer within an electrolyte layer between said negative and positive poles.

2. The method according to claim 1, wherein said electrolyte solution in said negative pole layer and electrolyte solution in said positive pole layer are selected such that said electrochemical cell is sufficiently deliquescent for keeping said pole layers generally wet and sufficiently electroactive for obtaining ionic conductivity between said pole layers.

3. The method according to claim 1, wherein said interfacial separator layer comprises a polymer precipitate or a gel.

4. The method according to claim 1, wherein said interfacial separator layer self-forms via a physical interaction.

5. The method according to claim 4, wherein said physical interaction results in a formation of a polymer precipitate or a gel between said pole layers.

6. The method according to claim 1, wherein said interfacial separator layer self-forms via a chemical reaction.

7. The method according to claim 6, wherein said chemical reaction results in a formation of a polymer precipitate or a gel between said pole layers.

8. The method according to claim 1, wherein said interfacial separator layer self-forms via a physical interaction between at least one polymer and at least one polymer precipitating agent.

9. The method according to claim 8, wherein said at least one polymer includes poly(vinyl pyrrolidone) (PVP).

10. The method according to claim 9, wherein said at least one polymer precipitating agent includes zinc chloride.

11. The method according to claim 8, wherein said at least one polymer precipitating agent includes zinc chloride.

12. The method according to claim 8, wherein said at least one polymer includes at least one polysaccharide.

13. The method according to claim 12, wherein said at least one polymer precipitating agent includes zinc chloride.

14. The method according to claim 12, wherein said at least one polysaccharide includes chitosan.

15. The method according to claim 1, wherein said interfacial separator layer self-forms via a physical interaction between at least one polymer and at least one electrostatic cross-linking agent.

16. The method according to claim 15, wherein said at least one polymer includes at least one polysaccharide.

17. The method according to claim 16, wherein said at least one polysaccharide includes at least one carboxylated polysaccharide.

18. The method according to claim 16, wherein said at least one polysaccharide includes sodium alginate.

19. The method according to claim 16, wherein said at least one polysaccharide includes pectin.

20. The method according to claim 16, wherein said at least one electrostatic cross-linking agent includes zinc chloride.

21. The method according to claim 15, wherein said at least one electrostatic cross-linking agent includes zinc chloride.

22. The method according to claim 1, wherein said interfacial separator layer self-forms via a physical interaction between at least two polymers.

23. The method according to claim 22, wherein said physical interaction between said at least two polymers is selected from the group consisting of an electrostatic interaction and a non-electrostatic interaction.

24. The method according to claim 23, wherein said non-electrostatic interaction is selected from the group consisting of hydrogen bonding interaction and van-der-Waals interaction.

25. The method according to claim 22, wherein at least one of said at least two polymers is poly(acrylic acid).

26. The method according to claim 25, wherein at least one of said least two polymers is a polymer selected from the group consisting of PVP, poly(vinyl alcohol), poly(ethylene oxide) and poly(ethyl oxazoline) (PEOx).

27. The method according to claim 1, wherein said interfacial separator layer self-forms via a physical interaction between at least two polymers and at least one activator.

28. The method according to claim 27, wherein said at least one activator is selected from the group consisting of zinc chloride and $H_3O^{30}$ ions.

29. The method according to claim 27, wherein at least one of said at least two polymers is selected from the group consisting of poly(acrylic acid) and partially neutralized poly(acrylic acid).

30. The method according to claim 29, wherein said at least one activator is selected from the group consisting of zinc chloride and $H_3O^+$ ions.

31. The method according to claim 1, wherein said interfacial separator layer self-forms via a chemical reaction between at least one polymerizable unit and at least one polymerization activator.

32. The method according to claim 1, wherein at least one of said pole layers includes a material that is both deliquescent and electroactive.

33. The method according to claim 32, wherein said material includes zinc chloride.

34. The method according to claim 1, wherein said positive pole layer includes manganese dioxide powder and said negative pole layer includes zinc powder.

35. The method according to claim 34, wherein said negative pole layer further includes carbon powder.

36. The method according to claim 34, wherein said positive pole layer further includes carbon powder.

37. The method according to claim 1, and further comprising providing at least one terminal in electrical contact with at least one of said pole layers.

38. The method according to claim 1, further comprising: applying at least one terminal to at least one pole layer via a printing technology, wherein said terminal is in electrical contact with said pole layer.

39. The method of claim 1, wherein said electrolyte solution in negative pole layer and electrolyte solution in positive pole layer are comprised of aqueous electrolytes.

40. The method of claim 1, wherein there is no separately added separator.

41. The method of claim 1, wherein said electrolyte solution of said negative pole layer is different than said electrolyte solution of said positive pole layer.

42. The method of claim 1, wherein said electrolyte solution of said negative pole layer and said electrolyte solution of said positive pole layer are in a first physical state prior to contacting and a second physical state after contacting, wherein said first and second physical states are not the same or wherein said second state includes a mixture of physical states.

43. The method of claim 1, wherein said interfacial separator layer self-forms either as a gel or as a polymer precipitate.

44. An electrochemical cell comprising:
a negative pole layer;
a positive pole layer; and
an integral and in-situ formed interfacial separator layer interposed therebetween within an electrolyte layer, wherein said integral and in-situ formed interfacial separator layer is comprised of interaction and/or reaction products of components in electrolyte solution in negative pole layer and components in electrolyte solution in positive pole layer and wherein there is no separately added separator.

45. The cell according to claim 44, wherein at least said electrolyte solution in said negative pole layer and electrolyte solution in said positive pole layer are selected such that said electrochemical cell is sufficiently deliquescent for keeping said layers generally wet and sufficiently electroactive for obtaining ionic conductivity between said pole layers.

46. The cell according to claim 44, wherein said interfacial separator layer comprises a polymer precipitate or a gel.

47. The cell according to claim 44, wherein said interfacial separator layer self-forms via a physical interaction.

48. The cell according to claim 47, wherein said physical interaction results in a formation of a polymer precipitate or a gel between said pole layers.

49. The cell according to claim 44, wherein said interfacial separator layer self-forms via a chemical reaction.

50. The cell according to claim 49, wherein said chemical reaction results in a formation of a polymer precipitate or a gel between said pole layers.

51. The cell according to claim 44, wherein said interfacial separator layer self-forms via a physical interaction between at least one polymer and at least one polymer precipitating agent.

52. The cell according to claim 51, wherein said at least one polymer includes poly(vinyl pyrrolidone) (PVP).

53. The cell according to claim 52, wherein said at least one polymer precipitating agent includes zinc chloride.

54. The cell according to claim 51, wherein said at least one polymer precipitating agent includes zinc chloride.

55. The cell according to claim 51, wherein said at least one polymer includes at least one polysaccharide.

56. The cell according to claim 55, wherein said at least one polymer precipitating agent includes zinc chloride.

57. The cell according to claim 55, wherein said at least one polysaccharide includes chitosan.

58. The cell according to claim 44, wherein said interfacial separator layer self-forms via a physical interaction between at least one polymer and at least one electrostatic cross-linking agent.

59. The cell according to claim 58, wherein said at least one polymer includes at least one polysaccharide.

60. The cell according to claim 59, wherein said at least one polysaccharide includes at least one carboxylated polysaccharide.

61. The cell according to claim 59, wherein said at least one polysaccharide includes sodium alginate.

62. The cell according to claim 59, wherein said at least one polysaccharide includes pectin.

63. The cell according to claim 59, wherein said at least one electrostatic cross-linking agent includes zinc chloride.

64. The cell according to claim 58, wherein said at least one electrostatic cross-linking agent includes zinc chloride.

65. The cell according to claim 44, wherein said interfacial separator layer self-forms via a physical interaction between at least two polymers.

66. The cell according to claim 65, wherein said physical interaction between said at least two polymers is selected from the group consisting of an electrostatic interaction and a non-electrostatic interaction.

67. The cell according to claim 66, wherein said non-electrostatic interaction is selected from the group consisting of hydrogen bonding interaction and van-der-Waals interaction.

68. The cell according to claim 65, wherein at least one of said at least two polymers is poly(acrylic acid).

69. The cell according to claim 68, wherein at least one of said least two polymers is a polymer selected from the group consisting of PVP, poly(vinyl alcohol), poly(ethylene oxide) and poly(ethyl oxazoline) (PEOx).

70. The cell according to claim 44, wherein said interfacial separator layer self-forms via a physical interaction between at least two polymers and at least one activator.

71. The cell according to claim 70, wherein said at least one activator is selected from the group consisting of zinc chloride and $H_3O^+$ ions.

72. The cell according to claim 70, wherein at least one of said at least two polymers is selected from the group consisting of poly(acrylic acid) and partially neutralized poly(acrylic acid).

73. The cell according to claim 72, wherein said at least one activator is selected from the group consisting of zinc chloride and $H_3O^{+\ ions.}$ 74. The cell according to claim 44, wherein said interfacial separator layer self-forms via a chemical reaction between at least one polymerizable unit and at least one polymerization activator.

75. The cell according to claim 44, wherein at least one of said pole layers includes a material that is both deliquescent and electroactive.

76. The cell according to claim 75, wherein said material includes zinc chloride.

77. The cell according to claim 44, wherein said positive pole layer includes manganese dioxide powder and said negative pole layer includes zinc powder.

78. The cell according to claim 77, wherein said negative pole layer further includes carbon powder.

79. The cell according to claim 77, wherein said positive pole layer further includes carbon powder.

80. The cell according to claim 44, and further comprising at least one terminal in electrical contact with at least one of said pole layers.

81. The cell of claim 44, wherein said electrolyte solution in negative pole layer and electrolyte solution in positive pole layer are comprised of aqueous electrolyte solutions.

82. The cell of claim 44, wherein said electrolyte solution of said negative pole layer is different than said electrolyte solution of said positive pole layer.

83. The cell of claim 44, wherein said electrolyte solution of said negative pole layer and said electrolyte solution of said positive pole layer are in a first state prior to contacting and a second state after contacting, wherein said first and second states are not equal or wherein said second state is a mixture of at least said first state and said second state.

84. The cell of claim 44, wherein said interfacial separator layer was formed in-situ as a gel or as a polymer precipitate.

85. A method of forming an electrochemical cell, the method comprising contacting a negative pole layer to a first side of a thin layer, the thin layer having a first side and an opposing second side, contacting a positive pole layer to the second side of the thin layer, wherein contacting causes electrolyte solution in negative pole layer, electrolyte solution in positive pole layer, and electrolyte solution in the thin layer to self-form a first interfacial separator layer within an electrolyte layer between said negative pole and said first side of said thin layer and to self-form a second interfacial separator layer within an electrolyte layer between said positive pole and said second side of said thin layer.

86. The method of claim 85, wherein the first and second interfacial separators self-form at both the first and second sides of the thin layer and integrate into a single self-formed, interfacial separator layer disposed between the negative and positive pole layers.

87. An electrochemical cell comprising:
a negative pole layer including a first electrolyte solution;
a positive pole layer including a second electrolyte solution;
a thin layer having a first side and an opposing second side, said thin layer interposed between said negative and positive pole layers, wherein said first side of said thin layer is adjacent to said negative pole layer and said second side of said thin layer is adjacent to said positive pole layer;
an integral first interfacial separator layer within an electrolyte layer between said negative pole and said first side of said thin layer; and
an integral second interfacial separator layer within an electrolyte layer between said positive pole and said second side of said thin layer, wherein said first and second interfacial separator layers were formed in-situ.

88. The cell of claim 87, wherein said first and second interfacial separators are merged to form a continuous interfacial separator layer disposed between the negative and positive pole layers.

89. A method of forming an electrochemical cell, the method comprising inserting a thin layer solution between a negative pole layer and a positive pole layer, such that interaction and/or reaction between components in the thin layer, components in the electrolyte solution in the negative pole layer, and components in the electrolyte solution in the positive pole layer self-form an interfacial separator layer.

90. The method of claim 89 wherein the interfacial separator layer self forms as a gel or a precipitate.

91. The method of claim 89, wherein said thin layer is an aqueous solution.

* * * * *

UNITED STATES PATENT AND TRADEMARK OFFICE
CERTIFICATE OF CORRECTION

PATENT NO. : 7,022,431 B2 Page 1 of 1
APPLICATION NO. : 09/931943
DATED : April 4, 2006
INVENTOR(S) : Shchori et al.

It is certified that error appears in the above-identified patent and that said Letters Patent is hereby corrected as shown below:

| Column | Line | |
|---|---|---|
| 14 | 63 | Change "$H_3O^{30}$" to --$H_3O^+$--. |
| 17 | 7 | Change "$H_3O^{+\ ions.}$" to --$H_3O^+$ ions.--. |

Signed and Sealed this

Fifteenth Day of August, 2006

JON W. DUDAS
*Director of the United States Patent and Trademark Office*